(12) United States Patent
Fukunaga

(10) Patent No.: US 10,243,427 B2
(45) Date of Patent: Mar. 26, 2019

(54) MOTOR

(71) Applicant: Nidec Corporation, Minami-ku, Kyoto (JP)

(72) Inventor: Keisuke Fukunaga, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 196 days.

(21) Appl. No.: 15/038,213

(22) PCT Filed: Nov. 21, 2014

(86) PCT No.: PCT/JP2014/080864
§ 371 (c)(1),
(2) Date: May 20, 2016

(87) PCT Pub. No.: WO2015/080034
PCT Pub. Date: Jun. 4, 2015

(65) Prior Publication Data
US 2016/0294253 A1   Oct. 6, 2016

(30) Foreign Application Priority Data

Nov. 26, 2013   (JP) ................................ 2013-243466

(51) Int. Cl.
*H02K 7/06* (2006.01)
*F16H 25/22* (2006.01)
(Continued)

(52) U.S. Cl.
CPC ........... *H02K 7/06* (2013.01); *F16H 25/2204* (2013.01); *H02K 1/278* (2013.01); *H02K 1/28* (2013.01);
(Continued)

(58) Field of Classification Search
CPC ............ H02K 1/02; H02K 1/14; H02K 1/148; H02K 7/06; H02K 7/08; H02K 7/083;
(Continued)

(56) References Cited

U.S. PATENT DOCUMENTS 3,918,777 A * 11/1975 Kitchin ................. F16C 33/425
29/898.067
4,334,720 A * 6/1982 Signer ..................... F16C 33/60
384/475

(Continued)

FOREIGN PATENT DOCUMENTS

JP    S6011667 U    1/1985
JP    H06002446 Y2  1/1994
(Continued)

OTHER PUBLICATIONS

International Search Report corresponding to Application No. PCT/JP2014/080864; dated Feb. 17, 2015, with English translation.

*Primary Examiner* — Tran Nguyen
(74) *Attorney, Agent, or Firm* — Cantor Colburn LLP

(57) ABSTRACT

A rotary unit of this motor has a plurality of magnets, a hollow shaft which has a tubular shape, and a ball nut. Each of the magnets is in contact with an outer surface of the hollow shaft. The ball nut is disposed on a radially inner side of the hollow shaft. At least a portion of the magnets, at least a portion of the hollow shaft, and at least a portion of the ball nut overlap in a circumferential direction. The hollow shaft and the ball nut are made of a magnetic material. An inner circumferential surface of the hollow shaft and an outer circumferential surface of the ball nut are in contact with each other.

27 Claims, 8 Drawing Sheets

(51) Int. Cl.
*H02K 1/27* (2006.01)
*H02K 1/28* (2006.01)
*H02K 7/08* (2006.01)
*F16H 25/20* (2006.01)

(52) U.S. Cl.
CPC ..... *H02K 7/083* (2013.01); *F16H 2025/2078* (2013.01)

(58) Field of Classification Search
CPC .......... H02K 16/02; H02K 1/27; H02K 1/278; H02K 1/28; H02K 29/03; H02K 21/12; H02K 21/14; F16H 25/20; F16H 25/22; F16H 25/22; F16H 25/2204; F16H 57/029; F16H 25/24; B29C 45/50; B29C 45/5008; B61F 5/24; B61F 5/245
See application file for complete search history.

(56) References Cited

U.S. PATENT DOCUMENTS

| | | | | |
|---|---|---|---|---|
| 5,041,748 A | * | 8/1991 | Huber | F16H 25/2204 192/141 |
| 5,162,685 A | * | 11/1992 | Yamaguchi | H02K 1/278 310/156.12 |
| 6,499,374 B1 | * | 12/2002 | Ohga | F16C 19/20 74/424.82 |
| 6,511,228 B2 | * | 1/2003 | Dusza | F16C 33/6651 384/475 |
| 6,597,078 B2 | * | 7/2003 | Crapo | B62D 5/0403 310/156.01 |
| 7,356,926 B2 | * | 4/2008 | Bridges | B25B 27/062 29/256 |
| 7,531,933 B2 | * | 5/2009 | Miyata | H02K 1/02 310/156.38 |
| 7,626,301 B2 | * | 12/2009 | Enomoto | H02K 1/02 310/216.004 |
| 2005/0128035 A1 | * | 6/2005 | Otaki | F16H 61/32 335/220 |
| 2009/0251023 A1 | * | 10/2009 | Nakano | H02K 1/278 310/156.38 |
| 2011/0031074 A1 | | 2/2011 | Ishii | |
| 2013/0249464 A1 | * | 9/2013 | Knox | B60G 17/0157 318/625 |

FOREIGN PATENT DOCUMENTS

| | | |
|---|---|---|
| JP | 2000078783 A | 3/2000 |
| JP | 2001088717 A | 4/2001 |
| JP | 2004069013 A | 3/2004 |
| JP | 2004208489 A | 7/2004 |
| JP | 2006132722 A | 5/2006 |
| JP | 2007187262 A | 7/2007 |
| JP | 2009074623 A | 4/2009 |
| JP | 2010242949 A | 10/2010 |
| JP | 2012019661 A | 1/2012 |

* cited by examiner

MOTOR

CROSS REFERENCE TO RELATED APPLICATIONS

This is the U.S. national stage of application No. PCT/JP2014/080864, filed on Nov. 21, 2014. Priority under 35 U.S.C. § 119(a) and 35 U.S.C. § 365(b) is claimed from Japanese Application No. 2013-243466, filed Nov. 26, 2013, the disclosure of which is incorporated herein by reference.

FIELD OF THE DISCLOSURE

The present disclosure relates to a motor.

BACKGROUND ART

From the past, an apparatus which is mounted on an automobile and generates output by converting a rotary motion of a motor into a linear motion by means of a ball screw has been known. For example, Japanese Patent Application Publication No. 2007-187262 describes an electric actuator which converts a rotary motion of an electric motor into a linear motion using a ball screw mechanism to drive an output shaft to perform a certain linear motion (see claim 1, and 'Field of the disclosure').

PRIOR ART

Patent Literature

[Patent Literature 1] Japanese Patent Application Publication No. 2007-187262

SUMMARY OF THE DISCLOSURE

Technical Problem to be Solved

In recent years, an improvement of fuel consumption rate for automobiles has been strongly demanded in attempts to reduce environmental loads. Accordingly, demands for a minimized and light-weighted motor is increasing for motors mounted on automobiles. In relation thereto, in the electric actuator of Japanese Patent Application Publication No. 2007-187262, the ball screw mechanism is disposed inside a rotor magnet of the motor. With this, the length of the electric actuator as a unit is reduced in a longitudinal direction of the output shaft of the ball screw mechanism (see Paragraph [0017], etc.).

However, in the structure disclosed in Japanese Patent Application Publication No. 2007-187262, a magnetic flux shielding ring is provided between the rotor magnet of the electric motor and a nut member of the ball screw mechanism (see Paragraph [0029], etc.). For this reason, the nut member, the magnetic flux shielding ring, and the rotor magnet are aligned in a row in a radial direction, so that the radial thickness is increased. In this structure, if the radial thickness of each element is simply reduced, it will be difficult to secure a magnetic path on a radially inner side of the rotor magnet, through which a magnetic flux should pass. When a magnetic path cannot be sufficiently secured, torque will be reduced, and as a result, the rotational speed of the electric motor will be reduced. Further, when the rotational speed of the electric motor is reduced, the velocity of a linear motion which is performed through the ball screw mechanism will be reduced.

At least an embodiment of the present disclosure provides a structure capable of securing a magnetic path on a radially inner side of a magnet while suppressing an increase in size in a radial direction, in a motor which converts a rotary motion into a linear motion by using a ball screw.

Structure of the Disclosure

A first exemplary embodiment of the present disclosure is a motor which moves a rod having a first screw groove of a spiral shape on its outer circumferential surface in front and rear directions along a center axis of the rod, and comprises a stationary unit, and a rotary unit which is rotatably supported relative to the stationary unit on the center axis, the stationary unit comprising a stator having a plurality of coils arranged in a circumferential direction, and a housing which retains the stator, the rotary unit comprising a plurality of magnets arranged in a circumferential direction on a radially inner side of the stator, a hollow shaft having a cylindrical shape, and a ball nut disposed on a radially inner side of the hollow shaft, in which at least a portion of each of the magnets, at least a portion of the hollow shaft, and at least a portion of the ball nut overlap in a radial direction, the ball nut has a second screw groove of a spiral shape on its inner circumferential surface, a plurality of spheres are interposed between the first screw groove and the second screw groove, a radial thickness of the hollow shaft on a radially inner side of a circumferential center portion of the magnets is thinner than a radial thickness of the hollow shaft on a radially inner side of a boundary portion of neighboring magnets, or a radial thickness of the hollow shaft at a circumferential end portion of a part of the hollow shaft disposed on a radially inner side of each of the magnets, the hollow shaft and the ball nut are made of a magnetic material, and the inner circumferential surface of the hollow shaft and the outer circumferential surface of the ball nut are in contact with each other.

Effects of the Disclosure

According to the first exemplary embodiment of the present disclosure, a portion of the ball nut can be used as a magnetic path. Therefore, it is possible to reduce the excessive thickness of the hollow shaft. As a result, a radial width of the motor is reduced, and a magnetic path is secured on a radially inner side of the magnet.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 8 is a cross-section view of a motor according to the modification.

DETAILED DESCRIPTION

Herein, exemplary embodiments of the present disclosure will be explained with reference to the drawings. Further, herein, a direction along a center axis of the rod is referred to as "axial direction", a direction orthogonal to the center axis of the rod is referred to as "radial direction", and a direction along a circular arc having its center on the center axis of the rod is referred to as "circumferential direction". Moreover, front and rear directions are described along the axial direction to explain the shape and positional relation of the elements. It is to be understood that this definition of front and rear directions is not intended to define a particular direction when the motor according to the present disclosure is actually manufactured and used.

Also, herein, the description of "parallel direction" includes substantially parallel directions. Further, the description of "orthogonal direction" includes substantially orthogonal directions.

<1. First Embodiment>

Figure 1:
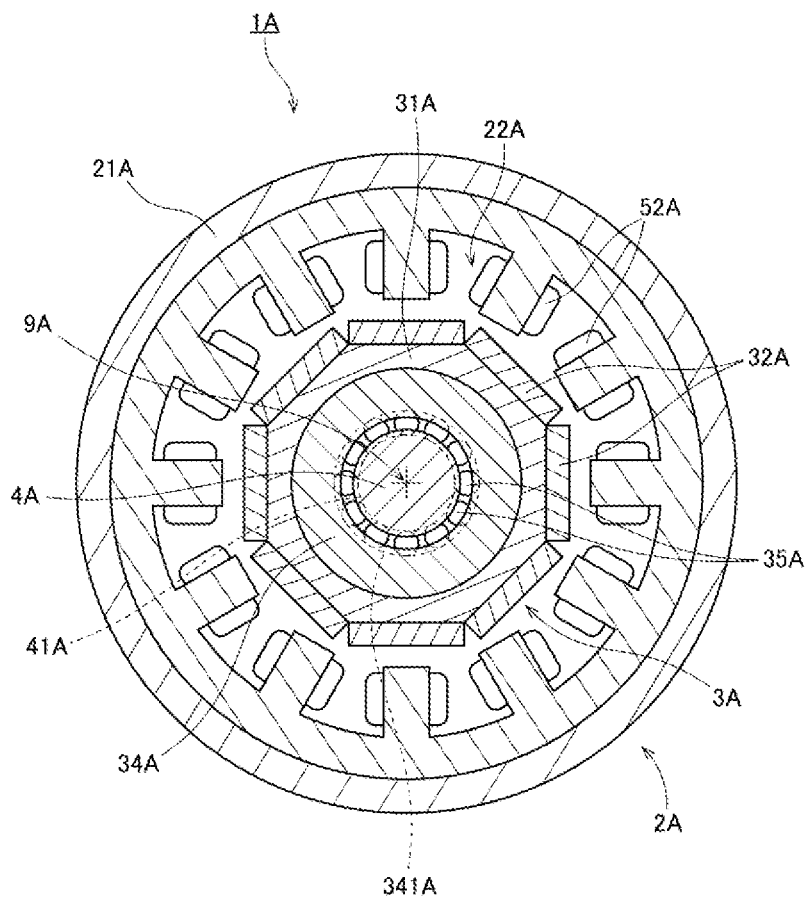
FIG. 1 is a cross-sectional view of a motor according to a first embodiment.

FIG. 1 is a cross-sectional view of a motor 1A according to a first embodiment of the present disclosure. The motor 1A is a device which moves a rod 4A in the front and rear directions. As shown in FIG. 1, the motor 1A has a stationary unit 2A and a rotary unit 3A. The rotary unit 3A is rotatably supported relative to the stationary unit 2A on a center axis 9A.

The stationary unit 2A has a housing 21A and a stator 22A which is retained inside the housing 21A. The stator 22A has a plurality of coils 52A. The plurality of coils 52A are arranged in the circumferential direction. The rotary unit 3A has a hollow shaft 31A of a cylindrical shape, a plurality of magnets 32A, and a ball nut 34A. The plurality of magnets 32A are arranged in the circumferential direction on a radially inner side of the stator 22A. Each of the magnets 32A is in contact with an outer surface of the hollow shaft 31A. The ball nut 34A is disposed on a radially inner side of the hollow shaft 31A.

The rod 4A has a first screw groove 41A of a spiral shape formed on its outer circumferential surface. The ball nut 34A has a second screw groove 341A of a spiral shape formed on its inner circumferential surface. A plurality of spheres 35A are interposed radially between the first screw groove 41A and the second screw groove 341A. Accordingly, when the rotary unit 3A rotates, a driving force generated therefrom is delivered to the rod 4A through the plurality of spheres 35A, so that the rod 4A is moved in the axial direction.

In this motor 1A, at least a portion of each of the magnets 32A, at least a portion of the hollow shaft 31A, and at least a portion of the ball nut 34A overlap in the radial direction. Further, a radial thickness of the hollow shaft 31A on a radially inner side of a circumferential center portion of each of the magnets 32A is thinner than a radial thickness of the hollow shaft 31A on a radially inner side of a boundary between neighboring magnets 32A, or a radial thickness of the hollow shaft 31A at a circumferential end portion of a part of the hollow shaft 31A disposed on a radially inner side of each of the magnets 32A.

The hollow shaft 31A and the ball nut 34A are formed of a magnetic material. Further, the inner circumferential surface of the hollow shaft 31A and the outer circumferential surface of the ball nut 34A are in contact with each other. For this reason, a portion of the ball nut 34A can be used as a magnetic path. Accordingly, it is possible to reduce a thickness of the hollow shaft 31A. As a result, it is possible to secure a magnetic path on a radially inner side of each of the magnets 32A while reducing a radial width of the motor 1A.

<2. Second Embodiment>

<2-1. Overall Structure of the Motor>

Figure 2:
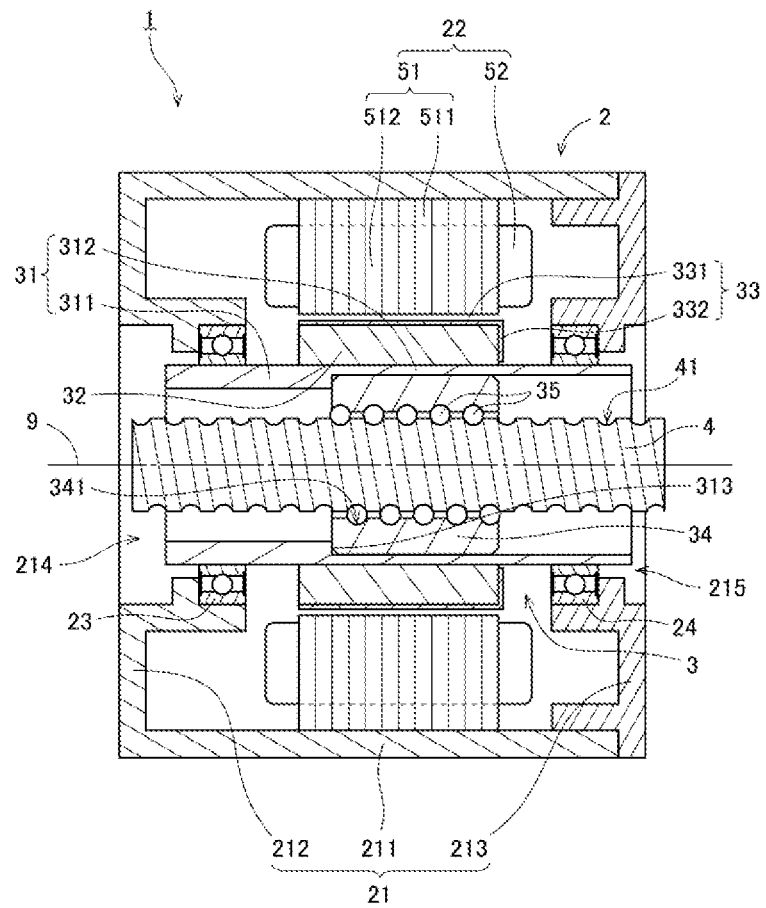
FIG. 2 is a vertical cross-sectional view of a motor according to a second embodiment.

Subsequently, a second exemplary embodiment of the present disclosure will be described. FIG. 2 is a vertical cross-sectional view of a motor 1 according to the second embodiment, including a center axis 9. Herein, for the convenience of explanation, the right side of FIG. 2 will be referred to as "front", and the left side of FIG. 2 will be referred to as "rear". This motor 1 is a device which converts a rotary motion to a linear motion in the axial direction by using a ball screw, and thus moves a rod 4 in front and rear directions. The motor 1 is securely mounted on an automobile, for example, and is used to drive each component inside the vehicle. However, the motor according to the present disclosure may be mounted on home appliances, OA equipment, medical devices and the like, and generate various kind of driving force.

This motor 1 is a so-called inner rotor type motor which has magnets 32 disposed on a radially inner side of a stator 22. As shown in FIG. 2, the motor 1 has a stationary unit 2, a rotary unit 3, and a rod 4. The stationary unit 2 is fixed to a frame of the equipment or device to be driven. The rotary unit 3 is rotatably supported relative to the stationary unit 2. The rod 4 is a columnar member, which is disposed horizontally along the center axis 9. The rod 4 has a first screw groove 41 formed on its outer circumferential surface.

The stationary unit 2 of this embodiment has a housing 21, a stator 22, a rear bearing 23, and a front bearing 24.

The housing 21 has a tubular portion 211, a rear wall portion 212, and a front wall portion 213. The tubular portion 211 axially extends in a substantially cylindrical shape on a radially outer side of the stator 22 and the rotary unit 3. The rear wall portion 212 expands perpendicular to the center axis 9 on a rear side of the stator 22. At the center of the rear wall portion 212, a rear circular hole 214 is provided, which is a passage for the rod 4 and a hollow shaft 31, which will be described later. The front wall portion 213 expands substantially perpendicular to the center axis 9 on a front side of the stator 22. At the center of the front wall portion 213, a front circular hole 215 is provided, which is a passage for the rod 4 and the hollow shaft 31, which will be described later.

As for materials for the tubular portion 211, the rear wall portion 212, and the front wall portion 213, metals, for example, aluminum or stainless and the like can be used. In the example shown in FIG. 2, the tubular portion 211 and the rear wall portion 212 are formed into one member, and the front wall portion 213 is formed as a separate member. Yet, it will be understood that the tubular portion 211 and the front wall portion 213 may be formed into one member, and the rear wall portion 212 may be formed as a separate member.

The stator 22 is disposed on a radially outer side of the magnets 32, which will be described later, and retained inside the housing 21. The stator 22 has a stator core 51, and a plurality of coils 52. The stator core 51 is formed of a laminated steel plate in which electromagnetic steel plates are axially laminated. The stator core 51 has core backs 511 having an annular ring shape, and a plurality of teeth 512 extend radially inward from the core backs 511. The core backs 511 are disposed substantially on the same axis as the center axis 9. Further, the outer circumferential surface of the core backs 511 is fixed to the inner circumferential surface of the tubular portion 211 of the housing 21.

The coils 52 are formed of conductive wires wound around each of the teeth 512. The plurality of teeth 512 and the plurality of coils 52 are, respectively, arranged in the circumferential direction at substantially equal Intervals. Insulation coating is applied on the surface of the teeth 512. The insulation coating is interposed between the teeth 512 and the coils 52, and thereby prevents the teeth 512 and the coils 52 from being electrically connected. Also, an insulator, which is formed of a resin member, may be interposed between the teeth 512 and the coils 52 instead of the insulation coating.

The rear bearing 23 and the front bearing 24 are disposed between the housing 21 and the hollow shaft 31 on the rotary unit 3 side. In this embodiment, a ball bearing, which rotates an outer ring relative to an inner ring through a sphere, is used for the rear bearing 23 and the front bearing 24. With this, the hollow shaft 31 is rotatably supported relative to the housing 21. Also, it will be understood that other types of bearings such as a plain bearing or a fluid bearing may be used instead of a ball bearing.

The rotary unit 3 of this embodiment has the hollow shaft 31, a plurality of magnets 32, a rotor cover 33, and a ball nut 34.

The hollow shaft 31 is on a radially outer side of the rod 4, and axially extends in a substantially cylindrical shape. As for materials for the hollow shaft 31, magnetic materials such as steel or stainless can be used. The hollow shaft 31 is supported by at least one of the rear bearing 23 and the front bearing 24, and rotates about the center axis 9.

As shown in FIG. 2, the hollow shaft 31 of this embodiment has a thick portion 311, and a thin portion which has a thinner radial thickness than the thick portion 311. The thick portion 311 is disposed at a rear side of the thin portion 312. An inner ring of the rear bearing 23 is fixed to an outer surface of the thick portion 311. An inner ring of the front bearing 24 is fixed to an outer surface of the thin portion 312. Further, the inner circumferential surface of the thick portion 311 is disposed on a radially inner side than the inner circumferential surface of the thin portion 312. A stepped surface 313 is interposed between the inner circumferential surface of the thick portion 311 and the inner circumferential surface of the thin portion 312.

The plurality of magnets 32 are disposed on a radially inner side of the stator 22. Each of the plurality of magnets 32 is fixed on an outer surface of the hollow shaft 31 by, for example, an adhesive. As shown in FIG. 2, an axial length of each of the magnets 32 is longer than an axial length of the ball nut 34. In this embodiment, the magnets 32 are disposed over both the outer circumferential surface of the thick portion 311 and the outer circumferential surface of the thin portion 312. A radially outward surface of each of the magnets 32 faces an end surface on a radially inner side of each of the teeth 512. The plurality of magnets 32 are arranged in the circumferential direction, such that N-poles and S-poles are alternately aligned. Yet, a single magnet having an annular ring shape in which N-poles and S-poles are alternately magnetized in the circumferential direction may be used instead of the plurality of magnets 32.

The rotor cover 33 has a cylinder portion 331, and an annular plate portion 332. The cylinder portion 331 extends in a cylindrical shape on a radially outer side of the plurality of magnets 32. The inner circumferential surface of the cylinder portion 331 is in contact with radially outer surfaces of the plurality of magnets 32. The annular plate portion 332 extends radially inward from a front end portion of the cylinder portion 331. A rear surface of the annular plate portion 332 is in contact with front end surfaces of the plurality of magnets 32. Due to the rotor cover 33, it is possible to prevent the magnets 32 from popping out to a radially outer side in spite of a centrifugal force which is applied to the plurality of magnets 32 when the motor 1 is driven. Further, even if a crack is occurred on the magnets 32, the rotor cover 33 prevents the broken pieces of the magnets 32 from being scattered to the outside.

Furthermore, the annular plate portion 332 may extend radially inward from a rear end portion of the cylinder portion 331. In this case, a front surface of the annular plate portion 332 is in contact with rear end surfaces of the plurality of magnets 32. Also, the annular plate portion 332 may extend radially inward from both directions of a front end portion and a rear end portion of the cylinder portion 331.

The ball nut 34 is disposed on a radially inner side of the hollow shaft 31. The ball nut 34 axially extends in a substantially cylindrical shape. A rear end surface of the ball nut 34 is abutted against the stepped surface 313 of the hollow shaft 31. The outer circumferential surface of the ball nut 34 is fixed to the inner circumferential surface of the thin portion 312. Further, the ball nut 34 has a second screw groove 341 of a spiral shape formed on its inner circumferential surface. A plurality of spheres 35 are interposed between the first screw groove 41 and the second screw groove 341 in the radial direction.

The ball nut 34 is formed of a magnetic material such as steel or magnetic stainless and the like. Specifically, a bearing steel of JIS G 4805:2008 standard or ISO 683-17:1999 standard may be used as a material for the ball nut 34. With this bearing steel, as it will be described in more detail later, a portion of the ball nut 34 can be used as a magnetic path, and further, the ball nut 34 can have high durability.

In this motor 1, when drive current is supplied to the coils 52, a magnetic flux is generated in the plurality of teeth 512 of the stator core 51. Then, by the action of the magnetic flux between the teeth 512 and the magnets 32, a torque is generated in the circumferential direction. As a result, the rotary unit 3 rotates about the center axis 9. Further, when the ball nut 34 rotates, a driving force in the circumferential direction is converted into a driving force in the axial direction by the plurality of spheres 35, and delivered to the rod 4. As a result, the rod 4 moves in the axial direction.

<2-2. Structures of the Hollow Shaft, the Magnets, and the Ball Nut>

Figure 3:
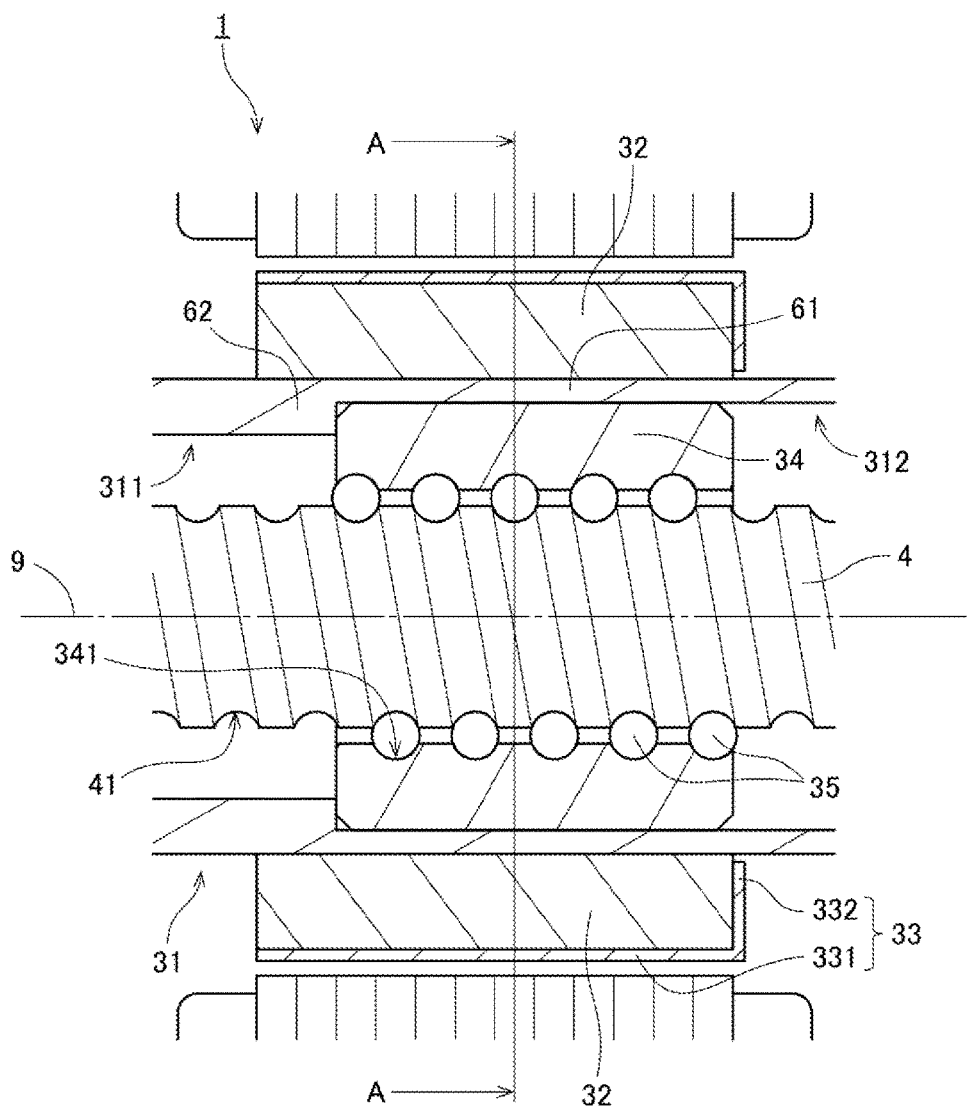
FIG. 3 is a partial vertical cross-sectional view of the motor according to the second embodiment.
Figure 4:
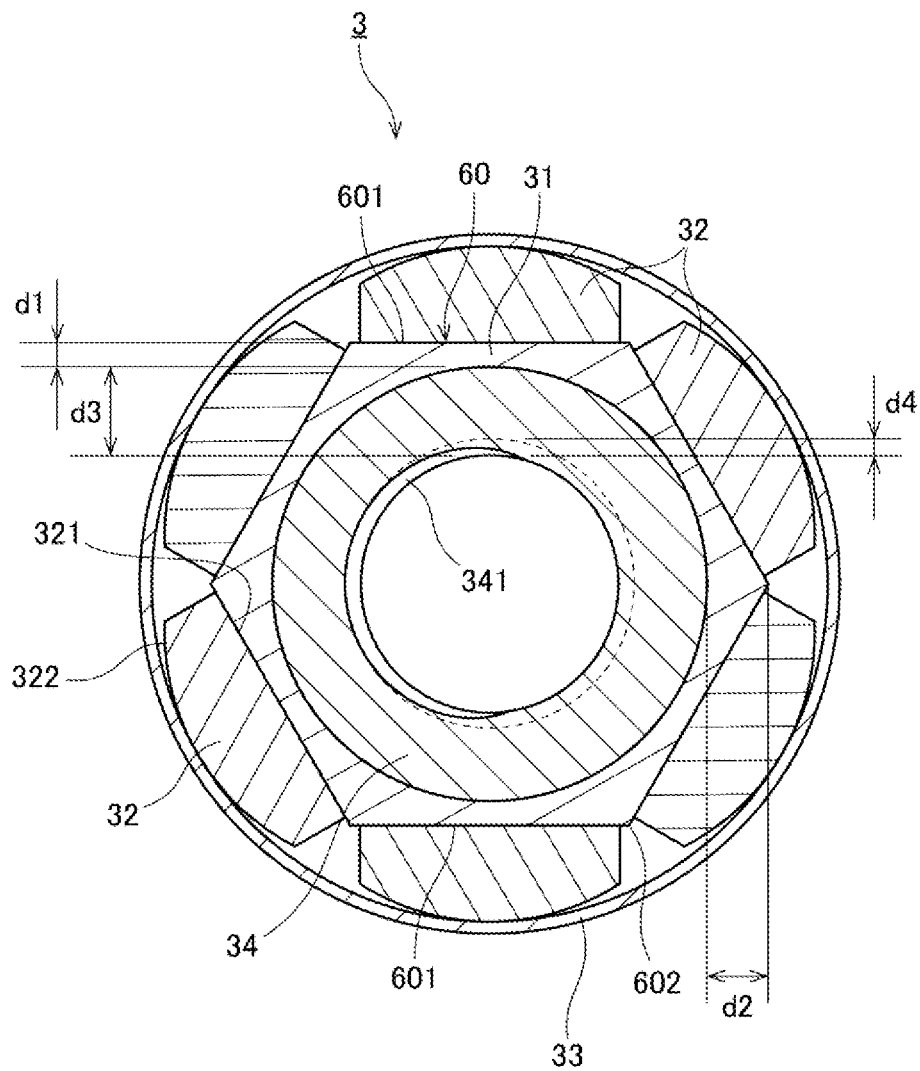
FIG. 4 is a cross-sectional view of a rotary unit according to the second embodiment.
Figure 5:
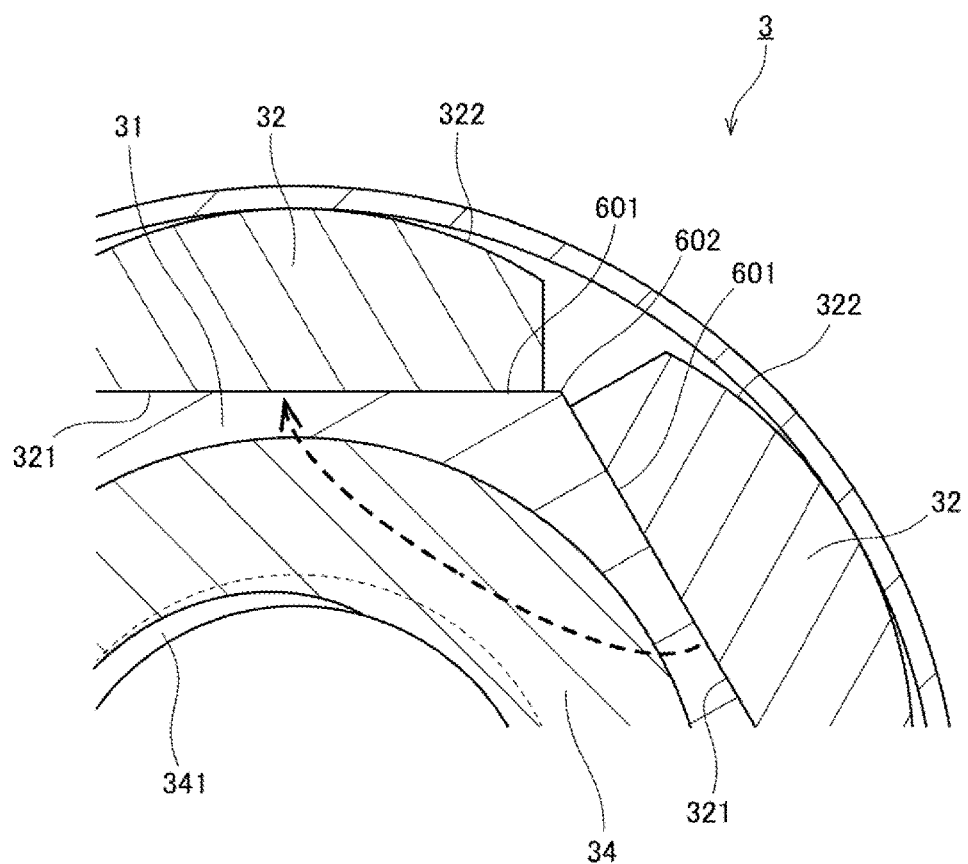
FIG. 5 is a partial cross-sectional view of the rotary unit according to the second embodiment.

Subsequently, detailed structures of the hollow shaft 31, the plurality of magnets 32, and the ball nut 34 will be explained. FIG. 3 is a partial cross-sectional view of the motor 1 near the ball nut 34. FIG. 4 is a cross-sectional view of the rotary unit 3 taken along the A-A line in FIG. 3. FIG. 5 is a partial cross-sectional view of the rotary unit 3.

As shown in FIG. 4 and FIG. 5, in this embodiment, each of the plurality of the magnets 32 has an inner magnetic pole surface 321 and an outer magnetic pole surface 322. The inner magnetic pole surface 321 is a radially inward surface of the magnets 32, and expands as a flat surface substantially perpendicular to the radial direction. The outer magnetic pole surface 322 is a radially outer surface of the magnets 32, and protrudes toward a radially outer side. Therefore, the radial thickness of a circumferential center portion of each of the magnets 32 is thicker than the circumferential thickness of both circumferential end portions of each of the magnets 32. With this, when the circumferential center portion of each of the magnets 32 is thickened, it is possible to enlarge only a volume of the magnets 32 without increasing a radial width of the rotary unit 3. As a result, a stronger magnetic force can be obtained.

Meanwhile, when seen in a cross-sectional view, the hollow shaft 31 has a polygonal outer surface 60. That is, the outer surface 60 of the hollow shaft 31 includes a plurality of flat surfaces 601 arranged in the circumferential direction. Each of the flat surfaces 601 expands substantially perpendicular to the radial direction. The inner magnetic pole surface 321 of each of the magnets 32 is respectively in contact with each of the flat surfaces 601. Also, the hollow shaft 31 has corner portions 602, which are sharpened radially outward at intersections between neighboring flat surfaces 601. Each angular portion 602 is interposed between neighboring magnets 32. With this, dislocation of each of the magnets 32 in the circumferential direction can be suppressed.

As described above, the hollow shaft 31 and the ball nut 34 are formed of a magnetic material. Also, the inner circumferential surface of the hollow shaft 31 and the outer circumferential surface of the ball nut 34 are in contact with each other. For this reason, as shown with the broken-line arrow in FIG. 5, magnetic flux 320 generated from one of the magnets 32 passes through the hollow shaft 31 and a portion of the ball nut 34, and flows to another magnets 32. That is, the hollow shaft 31 and a portion of the ball nut 34 can be used as a magnetic path. By using not only the hollow shaft 31 but also a portion of the ball nut 34 as a magnetic path, an excessive thickness of the hollow shaft 31 can be reduced. Accordingly, a magnetic path on a radially inner side of the magnets 32 can be secured while suppressing the radial thickness of the motor 1.

In this embodiment, the radial thickness of the hollow shaft 31 on a radially inner side of a circumferential center portion of the magnets 32 is reduced. That is, as shown in FIG. 4, when the radial thickness of the hollow shaft 31 on a radially inner side of a circumferential center portion of the magnets 32 is denoted by d1, and the radial thickness of the hollow shaft 31 on a radially inner side of a boundary between neighboring magnets 32 is denoted by d2, d1 is thinner than d2. Accordingly, the outer surface 60 of the hollow shaft 31 has a polygonal shape, and a magnetic path is secured on a radially inner side of the magnets 32.

Also as shown in FIG. 4, d3 denotes the radial thickness of the ball nut 34. Further, when d4 denotes a depth of the second screw groove, the motor 1 according to this embodiment satisfies a relation of d1+d3−d4≥d2. When this relation is satisfied, the radial thickness of a portion which includes the hollow shaft 31 and the ball nut 341 excluding the second screw groove 341 becomes thicker. Accordingly, it is possible to use a portion of the ball nut 34 as a magnetic path, and also prevent a magnetic flux from reaching into the second screw groove 341. As a result, it is possible to inhibit an occurrence of electrolytic corrosion phenomena which may be caused by the magnetization of the spheres 35.

As shown in FIG. 3, the thin portion 312 of the hollow shaft 31 has a first tube portion 61. The thick portion 311 of the hollow shaft 31 has a second tube portion 62. The first tube portion 61 is disposed between the plurality of magnets 32 and the ball nut 34. That is, the cylindrical outer circumferential surface of the ball nut 34 is covered by the first tube portion 61. With this, in this embodiment, a portion on the front side of the magnets 32, the first tube portion 61 of the hollow shaft 31, and the ball nut 34 overlap in the radial direction. The second tube portion 62 is disposed behind the first tube portion 61 and the ball nut 34. Further, the second tube portion 62 is disposed on a radially inner side of the magnets 32.

In this embodiment, the inner circumferential surface of the first tube portion 61 and the outer circumferential surface of the ball nut 34 are both cylindrical surfaces. Accordingly, the inner circumferential surface of the first tube portion 61 and the outer circumferential surface of the ball nut 34 can easily get in close contact with each other. As a result, it is possible for a magnetic flux to flow more effectively between the first tube portion 61 and the ball nut 34.

Also in this embodiment, the inner diameter of the second tube portion 62 is smaller than the inner diameter of the first tube portion 61. Accordingly, the inner circumferential surface of the second tube portion 62 is disposed on a radially inner side than the outer circumferential surface of the ball nut 34. Since the ball nut 34 is not disposed on a radially inner side of the second tube portion 62, the ball nut 34 cannot be used as a magnetic path. However, in this embodiment, the radial thickness of the second tube portion 62 itself is bigger than the radial thickness of the first tube portion 61. As a result, a magnetic path can also be secured in the second tube portion 62. Further, by differentiating the inner diameter of the first tube portion 61 from the inner diameter of the second tube portion 62, the stepped surface 313 is formed between the first tube portion 61 and the second tube portion 62. With this stepped surface 313, the location of the ball nut 34 can be easily determined.

Further, in this embodiment, the inner circumferential surface of the second tube portion 62 is disposed on a radially outer side than a bottom surface of the second screw groove 341. For this reason, it is possible to suppress a magnetic flux leakage from the second tube portion 62 toward the vicinity of the second screw groove 341. As a result, it is possible to further inhibit the occurrence of electrolytic corrosion phenomena which may be caused by the magnetization of the spheres 35.

<3.Modification>

Although exemplary embodiments of the present disclosure have been described above, it is to be understood that the present disclosure is not limited thereto.

Figure 6:
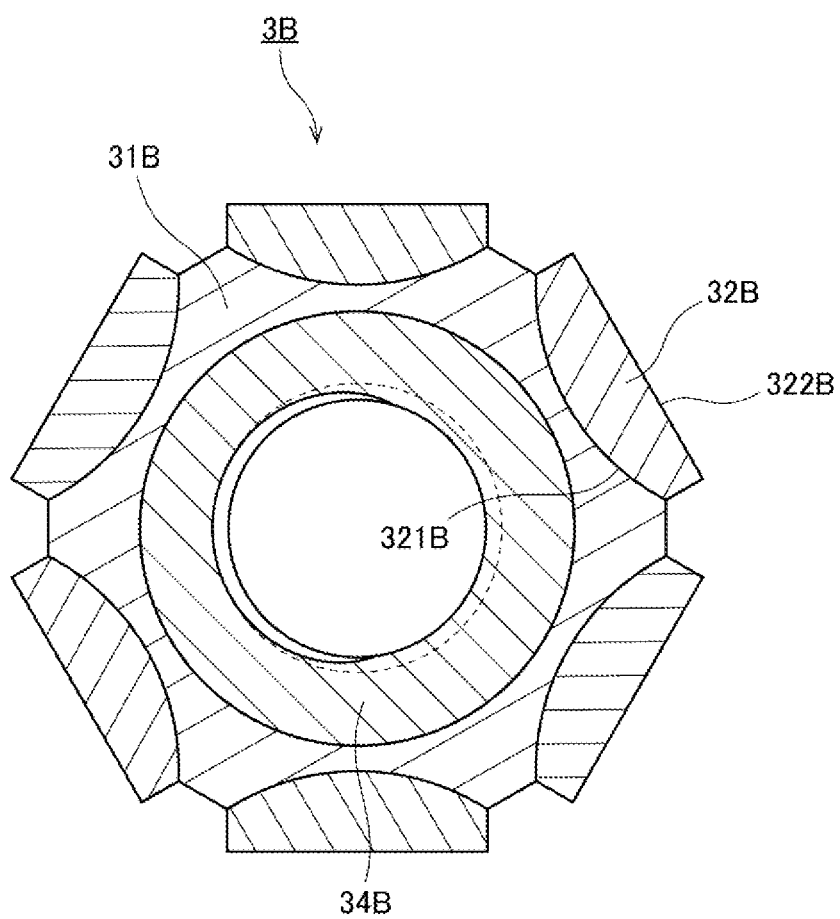
FIG. 6 is a cross-sectional view of a rotary unit according to a modification.
Figure 6:
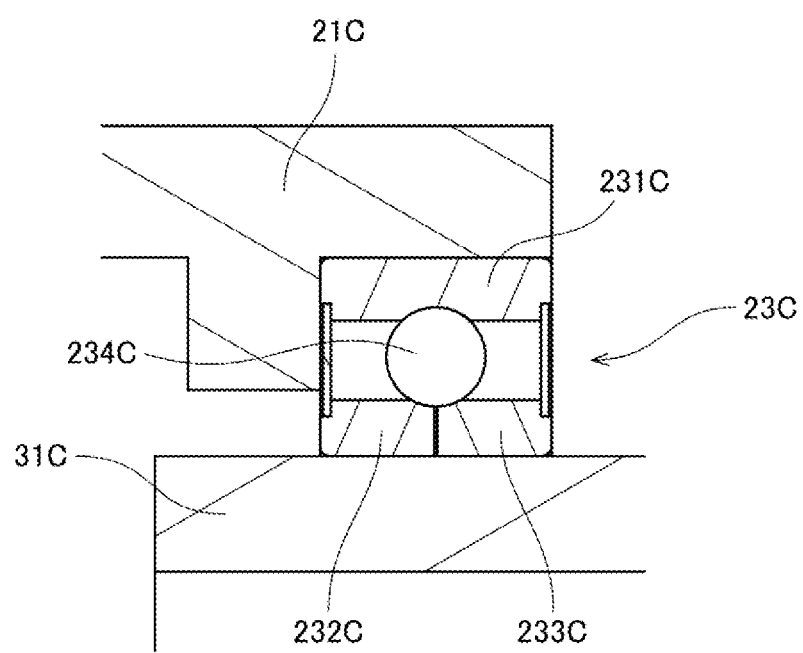

FIG. 6 is a cross-sectional view of a rotary unit 3B according to a modification. In the example shown in FIG. 6, an outer magnetic pole surface 322B of the magnet 32B expands as a flat surface which is substantially perpendicular to the radial direction. Further, an inner magnetic pole surface 321B of the magnet 32B protrudes toward a radially inner side. Also in this case, the radial thickness of a hollow shaft 31B can be reduced by using the hollow shaft 31B and a portion of a ball nut 34B as a magnetic path. Accordingly, a magnetic path on a radially inner side of the magnets 32B can be secured while suppressing the radial width of the rotary unit 3B.

The inner magnetic pole surface of the magnets may protrude toward a radially inner side, or the outer magnetic pole surface may protrude toward a radially outer side.

Figure 7:
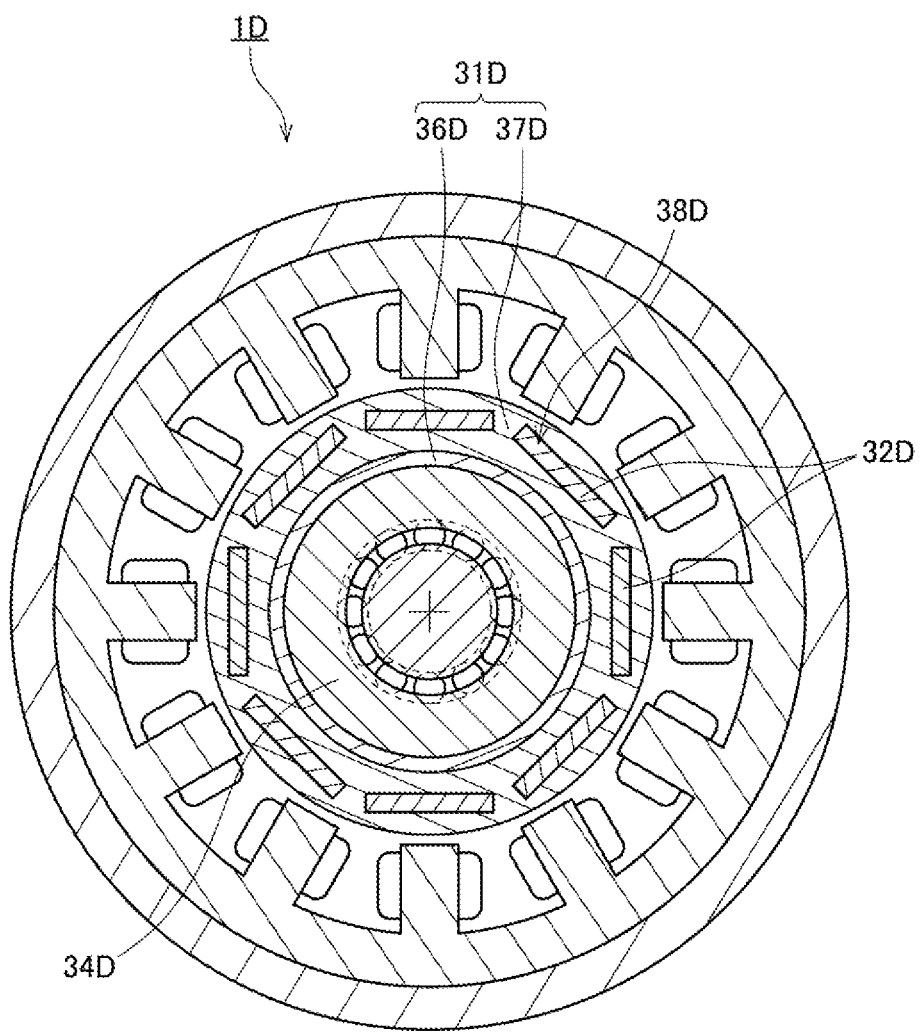
FIG. 7 is a partial vertical cross-sectional view of a motor according to the modification.

Further, one may use a ball bearing in a rear bearing or a front bearing, in which the rigidity in the axial direction is higher than the rigidity in the radial direction. FIG. 7 is a partial vertical cross-sectional view nearby a rear bearing 23c which uses a ball bearing in which the rigidity in the axial direction is higher than the rigidity in the radial direction. The rear baring 23C of FIG. 7 has an outer ring 231C, two inner rings 232C, 233C, and a plurality of balls 234C. The outer ring 231C is fixed to a housing 21C of the motor. The two inner rings 232C, 233C are arranged in the axial direction. Each of the inner rings 232C, 233C is fixed to a hollow shaft 31C. The plurality of balls 234C are in contact with the outer ring 231C and the two inner rings 232C, 233C. With this three point contact type ball bearing, it is possible to increase an axial bearing capacity of the hollow shaft 31B relative to the housing 21C. Accordingly, it is possible to precisely move a rod in the axial direction, while suppressing a dislocation of the hollow shaft 31B in the axial direction.

Furthermore, other than the three point contact type ball bearing, a radial thrust bearing, an angular bearing and the like may be used as a ball bearing in which the rigidity in the axial direction is higher than the rigidity in the radial direction. Also, a ball bearing in which the rigidity in the axial direction is higher than the rigidity in the radial direction may be used as the front bearing. A number of the outer ring in a bearing may be two or more. A number of the inner rings in a bearing may be three or more.

In the embodiment described above, the second tube portion 62 is disposed behind the first tube portion 61. However, the second tube portion may be disposed ahead of the first tube portion. That is, the second tube portion may be disposed ahead of or behind the ball nut in the axial direction, and also, at least a portion of the same may be disposed on a radially inner side of the magnet.

The inner circumferential surface of the hollow shaft and the outer circumferential surface of the ball nut do not necessarily need to be a cylindrical surface. For example, the inner circumferential surface of the hollow shaft and the outer circumferential surface of the ball nut may have a polygonal shape when seen in a cross-sectional view. The inner circumferential surface of the hollow shaft and the outer circumferential surface of the ball nut are in contact with each other so as to form a continuous magnetic path.

Further, the positional relation among the plurality of magnets, the hollow shaft, and the ball nut does not necessary need to be identical to the second embodiment. It may be modified as long as at least a portion of the magnets, at least a portion of the hollow shaft, and at least a portion of the ball nut overlap in the radial direction.

Furthermore, the hollow shaft may protrude in the radial direction along a radially overlapping portion of the hollow shaft and the magnets.

The motor of the second embodiment has a so-called SPM structure, in which the magnets are attached on a lateral surface of the hollow shaft; however, the motor of the present disclosure may have a so-called IPM structure, in which the magnets are embedded in the hollow shaft. When the IPM structure is employed, the magnets are disposed inside a plurality of inner holes provided to the hollow shaft. Also, the hollow shaft may be formed with a plurality of member without employing the SPM structure or the IPM structure. For example, the hollow shaft may be formed of two members, that is, an inner tubular member fixed to the ball nut, and a rotor core disposed on an outer side of the inner tubular member.

FIG. 8 is a cross-sectional view of a motor 1D of an IPM structure which has a hollow shaft 31D formed of two members. In the example shown in FIG. 8, the hollow shaft 31D is formed of an inner tubular member 36D and a rotor core 37D. The inner tubular member 36D is disposed on a radially outer side of a ball nut 34D, and axially extends in a cylindrical shape. The inner circumferential surface of the inner tubular member 36D is fixed to the outer circumferential surface of the ball nut 34D. The rotor core 37D is disposed on a radially outer side of the inner tubular member 36D, and axially extends in a cylindrical shape. The inner circumferential surface of the rotor core 37D is fixed to the outer circumferential surface of the inner tubular member 36D.

The rotor core 37D has a plurality of inner holes 38D arranged in the circumferential direction. Magnets 32D are disposed inside each of the inner holes 38D. That is, the plurality of magnets 32D are retained by the rotor core 37D. Also in the example shown in FIG. 8, respective portions of the magnets 32D, the ball nut 34D, the inner tubular member 36D, and the rotor core 37D overlap in the radial direction. Accordingly, a portion of the hollow shaft 31D and a portion of the ball nut 34D can be used as a magnetic path. Further, the radial thickness of the hollow shaft 31D measured from a radially inner side of a circumferential center portion of the magnets 32D is thinner than a radial thickness of the hollow shaft 31D measured from a circumferential end portion of a part on a radially inner side of the magnets 32D. Accordingly, the thickness of the hollow shaft 31D is reduced. As a result, a magnetic path can be secured on a radially inner side of the magnets 32D while suppressing the radial width of the motor 1D.

The detailed shape of each element may be different from the shape illustrated in each drawing of the present disclosure. The respective elements shown in the above-described embodiments and modification may be appropriately combined with each other as long as contradiction does not occur.

INDUSTRIAL APPLICABILITY

The present disclosure can be used in a motor.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A motor, which moves a rod, the rod having a first screw groove of a spiral shape formed on its outer circumferential surface, in front and rear directions along a center axis of the rod; the motor comprising:
   a stationary unit; and
   a rotary unit which is rotatably supported relative to the stationary unit about the center axis,
   wherein the stationary unit comprises:
      a stator comprising a plurality of coils arranged in a circumferential direction; and
      a housing which retains the stator,
   the rotary unit comprises:
      a plurality of magnets disposed on a radially inner side of the stator, and arranged in the circumferential direction;
      a hollow shaft which has a tubular shape; and
      a ball nut disposed on a radially inner side of the hollow shaft,
   at least a portion of the magnets, at least a portion of the hollow shaft, and at least a portion of the ball nut overlap in a radial direction,
   the ball nut has a second screw groove of a spiral shape formed on its inner circumferential surface,
   a plurality of spheres are interposed between the first screw groove and the second screw groove in the radial direction,
   a radial thickness of the hollow shaft on a radially inner side of a circumferential center portion of the magnets is thinner than a radial thickness of the hollow shaft on a radially inner side of a boundary of neighboring magnets, or a radial thickness of the hollow shaft at a circumferential end portion of a part of the hollow shaft disposed on a radially inner side of the magnets, the hollow shaft and the ball nut are made of magnetic material, and an inner circumferential surface of the hollow shaft and an outer circumferential surface of the ball nut are in contact with each other;

wherein an axial length of the magnets is longer than an axial length of the ball nut, the hollow shaft comprises:

a first tube portion which covers an outer circumferential surface of the ball nut; and a second tube portion that is radially thicker than the first tube portion, wherein the second tube portion is disposed on a front side or a rear side of the ball nut in the axial direction, and at least a portion of the second tube portion is disposed on a radially inner side of the magnets, and an inner circumferential surface of a part of the second tube portion disposed on a radially inner side of the magnets is disposed on a radially inner side of an outer circumferential surface of the ball nut, the ball nut and the second tube portion are axially opposite.

2. The motor according to claim 1,
wherein an inner circumferential surface of the hollow shaft and an outer circumferential surface of the ball nut are cylindrical surfaces.

3. The motor according to claim 1,
wherein an outer surface of the hollow shaft has a plurality of flat surfaces which are arranged in the circumferential direction, and
the plurality of magnets are respectively in contact with the plurality of flat surfaces.

4. The motor according to claim 3,
wherein each of the plurality of magnets has an inner magnetic pole surface which is in contact with one of the flat surfaces, and an outer magnetic pole surface which protrude toward a radially outer side, and
a radial thickness of the magnets at a circumferential center portion is thicker than a radial thickness of the magnets at both end portions.

5. The motor according to claim 1,
wherein the motor satisfies a relation of $d1+d3-d4 \geq d2$,
in which $d1$ denotes a radial thickness of the hollow shaft measured from a radially inner side on a circumferential center portion of the magnets, $d2$ denotes a radial thickness of the hollow shaft measured from a radially inner side on a boundary of neighboring magnets, $d3$ denotes a radial thickness of the ball nut, and $d4$ denotes a depth of the second screw groove.

6. The motor according to claim 1,
wherein the ball nut is formed of a bearing steel of JIS G 4805:2008 standard or ISO 683-17:1999 standard.

7. The motor according to claim 1,
wherein an inner circumferential surface of the second tube portion is disposed on a radially outer side than a bottom surface of the second screw groove.

8. The motor according to claim 1,
wherein the rotary unit further comprises a rotor cover which has a cylindrical shape and is in contact with radially outer surfaces of the plurality of magnets.

9. The motor according to claim 1,
further comprising a ball bearing which is interposed between the housing and the hollow shaft, wherein the ball bearing has a higher rigidity in an axial direction than that in a radial direction.

10. The motor according to claim 3,
wherein the motor satisfies a relation of $d1+d3-d4 \geq d2$,
in which $d1$ denotes a radial thickness of the hollow shaft measured from a radially inner side on a circumferential center portion of the magnets, $d2$ denotes a radial thickness of the hollow shaft measured from a radially inner side on a boundary of neighboring magnets, $d3$ denotes a radial thickness of the ball nut, and $d4$ denotes a depth of the second screw groove.

11. The motor according to claim 4,
wherein the motor satisfies a relation of $d1+d3-d4 \geq d2$,
in which $d1$ denotes a radial thickness of the hollow shaft measured from a radially inner side on a circumferential center portion of the magnets, $d2$ denotes a radial thickness of the hollow shaft measured from a radially inner side on a boundary of neighboring magnets, $d3$ denotes a radial thickness of the ball nut, and $d4$ denotes a depth of the second screw groove.

12. The motor according to claim 5,
wherein an axial length of the magnets is longer than an axial length of the ball nut,
the hollow shaft comprises:
a first tube portion which covers an outer circumferential surface of the ball nut; and
a second tube portion which is disposed on a front side or a rear side of the ball nut in the axial direction, and at least a portion of the second tube portion is disposed on a radially inner side of the magnets, and
an inner circumferential surface of a part of the second tube portion disposed on a radially inner side of the magnets is disposed on a radially inner side of an outer circumferential surface of the ball nut.

13. The motor according to claim 10,
wherein an axial length of the magnets is longer than an axial length of the ball nut,
the hollow shaft comprises:
a first tube portion which covers an outer circumferential surface of the ball nut; and
a second tube portion which is disposed on a front side or a rear side of the ball nut in the axial direction, and at least a portion of the second tube portion is disposed on a radially inner side of the magnets, and
an inner circumferential surface of a part of the second tube portion disposed on a radially inner side of the magnets is disposed on a radially inner side of an outer circumferential surface of the ball nut.

14. The motor according to claim 11,
wherein an axial length of the magnets is longer than an axial length of the ball nut,
the hollow shaft comprises:
a first tube portion which covers an outer circumferential surface of the ball nut; and
a second tube portion which is disposed on a front side or a rear side of the ball nut in the axial direction, and at least a portion of the second tube portion is disposed on a radially inner side of the magnets, and
an inner circumferential surface of a part of the second tube portion disposed on a radially inner side of the magnets is disposed on a radially inner side of an outer circumferential surface of the ball nut.

15. The motor according to claim 12,
wherein an inner circumferential surface of the second tube portion is disposed on a radially outer side than a bottom surface of the second screw groove.

16. The motor according to claim 13,
wherein an inner circumferential surface of the second tube portion is disposed on a radially outer side than a bottom surface of the second screw groove.

17. The motor according to claim 14,
wherein an inner circumferential surface of the second tube portion is disposed on a radially outer side than a bottom surface of the second screw groove.

18. The motor according to claim 12,
wherein the rotary unit further comprises a rotor cover which has a cylindrical shape and is in contact with radially outer surfaces of the plurality of magnets.

19. The motor according to claim 13,
wherein the rotary unit further comprises a rotor cover which has a cylindrical shape and is in contact with radially outer surfaces of the plurality of magnets.

20. The motor according to claim 14,
wherein the rotary unit further comprises a rotor cover which has a cylindrical shape and is in contact with radially outer surfaces of the plurality of magnets.

21. The motor according to claim 7,
wherein the rotary unit further comprises a rotor cover which has a cylindrical shape and is in contact with radially outer surfaces of the plurality of magnets.

22. The motor according to claim 5,
further comprising a ball bearing which is interposed between the housing and the hollow shaft,
wherein the ball bearing has a higher rigidity in an axial direction than that in a radial direction.

23. The motor according to claim 12,
further comprising a ball bearing which is interposed between the housing and the hollow shaft,
wherein the ball bearing has a higher rigidity in an axial direction than that in a radial direction.

24. The motor according to claim 13,
further comprising a ball bearing which is interposed between the housing and the hollow shaft,
wherein the ball bearing has a higher rigidity in an axial direction than that in a radial direction.

25. The motor according to claim 14,
further comprising a ball bearing which is interposed between the housing and the hollow shaft,
wherein the ball bearing has a higher rigidity in an axial direction than that in a radial direction.

26. The motor according to claim 7,
further comprising a ball bearing which is interposed between the housing and the hollow shaft,
wherein the ball bearing has a higher rigidity in an axial direction than that in a radial direction.

27. The motor according to claim 18,
further comprising a ball bearing which is interposed between the housing and the hollow shaft,
wherein the ball bearing has a higher rigidity in an axial direction than that in a radial direction.

* * * * *